United States Patent [19]
Li

[11] 3,980,459
[45] Sept. 14, 1976

[54] METHOD FOR MANUFACTURING OPTICAL FIBERS HAVING ECCENTRIC LONGITUDINAL INDEX INHOMOGENEITY

[75] Inventor: Tingye Li, Rumson, N.J.

[73] Assignee: Bell Telephone Laboratories, Incorporated, Murray Hill, N.J.

[22] Filed: Dec. 24, 1975

[21] Appl. No.: 644,135

[52] U.S. Cl. ........................... 65/18; 65/3 A; 65/13; 65/30 R; 65/DIG. 7; 350/96 WG; 427/166
[51] Int. Cl.² .................. C03B 25/02; C03B 37/02
[58] Field of Search ............ 65/2, 3 A, 4 B, 13, 65/18, 30 R, DIG. 7; 350/96 WG; 427/166

[56] References Cited
UNITED STATES PATENTS

| | | |
|---|---|---|
| 3,741,796 | 6/1973 | Walker .......................... 65/18 X |
| 3,883,336 | 5/1975 | Randall ......................... 65/18 |
| 3,932,160 | 1/1976 | Camlibel ........................ 65/18 |
| 3,932,162 | 1/1976 | Blankenship .................... 65/4 B X |

*Primary Examiner*—Robert L. Lindsay, Jr.
*Attorney, Agent, or Firm*—Bryan W. Sheffield

[57] ABSTRACT

In a chemical vapor deposition (CVD) process for manufacturing a fiber optic preform, a glass rod is inserted into the preform during the deposition of the core layer. This yields a fiber having a longitudinal eccentric index inhomogeneity which is close to the axis of the fiber.

13 Claims, 9 Drawing Figures

METHOD FOR MANUFACTURING OPTICAL FIBERS HAVING ECCENTRIC LONGITUDINAL INDEX INHOMOGENEITY

BACKGROUND OF THE INVENTION a. Field of the Invention

Broadly speaking, this invention relates to optical waveguides. More particularly, in a preferred embodiment, this invention relates to methods and apparatus for manufacturing an optical waveguide having azimuthal index inhomogeneities.

b. Discussion of the Prior Art

The advantages of deliberately enhancing mode conversion in a multi-mode optical waveguide have been widely reported in the literature. Typically, this enhancement is achieved by modulating the cross-sectional dimensions and axial orientation of the guide. See, for example, U.S. Pat. Nos. 3,687,514 and 3,666,348 which respectively issued on Aug. 29, 1972 to S. E. Miller et al and on May 30, 1972 to E. A. J. Marcatili. Both of these commonly assigned patents are hereby incorporated by reference into this specification.

Recent analytical studies by D. Marcuse have suggested the desirability of introducing azimuthal index variations into the guide to mix modes of different azimuthal order. These studies further suggest that any resultant radial index inhomogeneities (which mix radial orders) be confined to a region which is close to the axis of the core. Heretofore it has not been possible to implement either of Marcuse's proposals.

There are, of course, several different techniques which may be used to manufacture a clad optical fiber, including the so-called chemical vapor deposition (CVD) process disclosed in U.S. Pat. Nos. 3,711,262; 3,737,292 and 3,737,293. Of particular interest is the commonly-assigned, copending application, MacChesney-O'Connor, Ser. No. 444,705, filed Feb. 22, 1974, which application is hereby incorporated by reference. As disclosed in the MacChesney-O'Connor application, a constantly moving stream of gas-phase precursor reactants and oxygen is permitted to flow through a hollow, tubular, glass preform. The preform and its contents are then heated to a homogeneous reaction temperature within a moving hot zone produced by a moving heat source which constantly traverses the outside of the tube. Homogeneously produced glass particles, loosely called "soot", collect on the walls of the tube and are fused into a continuous layer within the hot zone. The preform is then collapsed and drawn into a fiber in the normal manner. This process differs from the prior art because in prior art processes a simultaneous, heterogenous reaction occurs which produces a glassy layer within the moving hot zone by means of a reaction which occurs at the heated wall surface.

SUMMARY OF THE INVENTION

The problem, then, is to modify the above-described CVD processes to yield a fiber having an azimuthal index variation. This problem has fortunately been solved by the instant invention which, in a preferred embodiment, comprises a modification of a method of manufacturing a preform of the type that includes the steps of flowing a vapor mixture, including at least one compound, glassforming, precursor together with an oxidizing medium, through a hollow, cylindrical substrate and then heating said substrate and contained vapor mixture with a moving heat source, external to the substrate, such that a suspension of particulate, oxidic reaction product material is produced within the substrate, said particulate material traveling downstream and coming to rest on the inner surface of the substrate and being fused to form a continuous glass deposit on the inner surface.

The modification comprises terminating the above-recited vapor-flowing and substrate-heating steps before the continuous glassy deposit has attained the desired thickness. Next, at least one longitudinally-extending rod is inserted into the substrate, the rod having a refractive index differing from the refractive index of the glassy deposit and being eccentrically positioned with the substrate. Then, the vapor-flowing and substrate-heating steps are restarted to resume the production of the glassy deposit, the deposit forming on the glassy deposit layer previously formed and on the rod. Finally, the vapor-flowing and substrate-heating steps are terminated when the glassy deposit has attained the desired thickness. The end product is a preform which, when subsequently collapsed and pulled, yields an optical fiber having an eccentric, longitudinal index inhomogeneity which is close to the axis of the fiber.

The invention and its mode of operation will be more fully understood from the following detailed description, when taken with the appended drawings, in which:

DETAILED DESCRIPTION OF THE INVENTION

Figure 1:
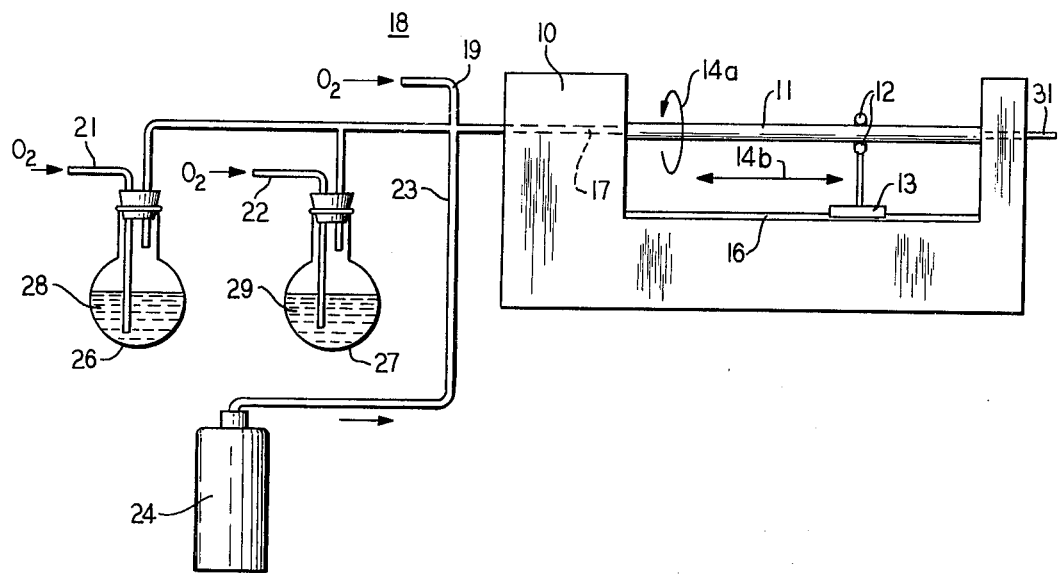
FIG. 1 is a front view of an illustrative chemical vapor deposition apparatus for manufacturing optical fiber according to the invention.

FIG. 1 depicts a lathe 10 holding a hollow glass preform 11 within which a hot zone 12 is produced by some suitable heating means 13. Advantageously, preform 11 is rotated, for example, in the direction shown by arrow 14a by means not shown and hot zone 12 caused to traverse preform 11 by movement of heating means 13 as schematically depicted by double-headed arrow 14b, for example, by a threaded feed member 16. A gaseous material is introduced into preform 11 via inlet tube 17 which is, in turn, connected to source material reservoirs 18. Such reservoirs may include an oxygen inlet 19 connected to means not shown. As depicted, gaseous material may also be introduced by inlets 21 and 22 by means not shown and through inlet 23 from reservoir 24. Reservoirs 26 and 27 each contain a normally liquid reactant material which is introduced into preform 11 by means of carrier gas introduced through inlets 21 and 22 such that the carrier gas is bubbled through liquid reactant material 28 and 29. Exiting material is exhausted through an outlet 31. Not shown is the arrangement of mixing valves and shut-off valves which may be utilized to meter flows and to make other necessary adjustments in composition. The apparatus of FIG. 1 is generally horizontally disposed, however, one skilled in the art will appreciate that the apparatus could be vertically disposed with only minor modification. Vertical disposition of the substrate tube, however, lends stability to the portion of the tube within the hot zone and may permit attainment of higher temperature or of longer hot zones in the traversal direction without objectionable distortion.

Figure 2:
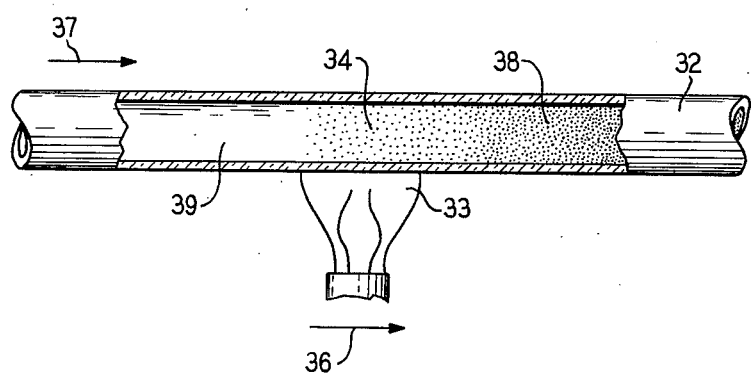
FIG. 2 is a partial cross-sectional view of the preform shown in FIG. 1 and depicts the nature of the deposition process.

FIG. 2 is a front elevational view of a section of a preform 32 as observed during deposition. Depicted in FIG. 2 is a heating means 33 producing a hot zone 34 which is traversing preform 32 in the direction shown by arrow 36 by means not shown. Gaseous material is introduced at the left end of preform 32 and flows in the broken section of the figure in the direction shown by arrow 37. Two regions are clearly observable during deposition. Zone 38 downstream of hot zone 34 is filled with a moving, powdery, suspension of particulate oxidic material, while region 39, devoid of such particulate matter, defines the region within which fusion of the deposited material is occurring. For a more detailed description of the modified CVD process and specific example of temperatures, dopant materials, etc. the reader is referred to the above-referenced, copending application of MacChesney and O'Connor. Suffice it to say here that the reactant materials may include chlorides and hydrides, as well as other compounds which will react with oxygen. As in other vapor reaction processes, other gaseous material may be introduced, for example, to act as carrier or, in the instance of extremely combustible reactant matter such as hydrides, to act as a diluent.

Continuous fusion within the hot zone and the resultant thickness uniformity of the deposit facilitates formation of graded index structures. As in conventional CVD processes, gradients may be produced by varying the reactant composition with the ratio of high index-producing dopants increasing, in this instance, with successive hot zone traversals. Since the reaction conditions for different constituents in the reactant mix are different, it is also possible to produce an index gradient by altering the temperature and/or the flow rate during processing.

Typical reaction temperatures maintained at least at the tube wall are within the range of from 1200 to 1600 degrees C. These temperatures, high relative to conventional CVD processes, are responsible for the rapidity of the preform production. Particularly at the high temperature end of the range, distortion of the usually silica preform is avoided by rotation. Narrow zones, increased rotation speed, and vertical disposition of the tube may all contribute to the avoidance of tube distortion.

Preforms adequate for the preparation of one or several kilometers of fiber may be prepared during deposition periods of only a few hours. These preforms are prepared by conventional processing from the deposited product to a final configuration which, as presently practiced, may be of rod shape with an internal diameter of from 4 to 8 mm and a length of 18 inches. Normally, the tube which serves as the deposition substrate becomes the cladding layer. It may be composed of pure silica or of silica which has been doped to alter, generally to reduce, its index. Variations of the process may include removal of the tube, as well as deposition of additional material on the outer surface. The tube serving as the substrate during deposition may be retained to serve as a cladding layer or it may be removed, or it may, during simultaneous deposition, be provided on its outer surface with encompassing layers, e.g., for protection purposes. The above-described process yields a preform having a uniform azimuthal gradient distribution. Let us now consider how an azimuthal index inhomogeneity can be produced.

Figure 3A:
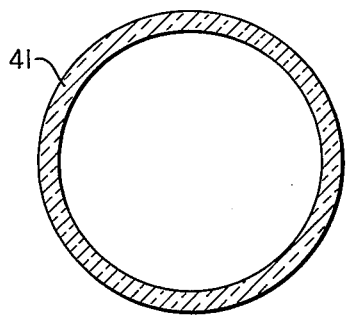
FIGS. 3a – 3d are cross-sectional views of the preform shown in FIG. 2 when the deposition process is modified according to the invention.

FIG. 3a is a cross-sectional view of a hollow glass preform 41 before any deposits have been built-up thereon. At this stage, the preform is more properly referred to as a substrate. Typically, substrate 41 is comprised of ordinary silica, generally undoped.

Figure 3B:
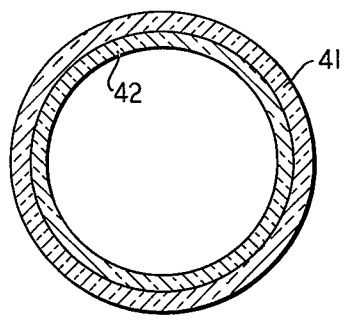

As shown in FIG. 3b, where the substrate is of ordinary purity, the first reactant which is introduced results in the formation of a first layer 42 of undoped silica or a silica which is doped with an oxide, such as $B_2O_3$, which serves to lower the refractive index. Of course, layer 42 also acts as a part of the cladding and presents a barrier to the diffusion of impurities from the tube. As previously mentioned, it may be considered that, under these circumstances, the substrate tube ultimately serves as a mechanical support rather than as an optical cladding layer.

Figure 3C:
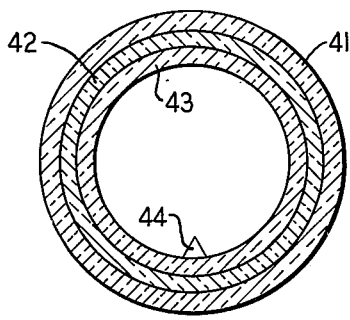

Subsequent to formation of this first barrier layer 42 or, in the absence of such procedure, where the tube is of sufficient purity, reactant materials of such nature as to result in the desired index-increased core are introduced into the vapors flowing through the tube. In a chloride system, for example, these reactant materials may take the form of a mixture of $SiCl_4$ together with, for example $GeCl_4$, and oxygen. Chlorides of other index-increasing materials, such as phosphorus, titanium, and aluminum may be substituted for $GeCl_4$ or admixed. $BCl_3$ may also be included perhaps to facilitate glass formation because of lowered fusion temperature; or because of refractive index lowering, the initial mixture may be altered during successive hot-zone traversals so as to increase the index (by increasing $GeCl_4$ or other index-increasing dopant precursor or by decreasing $BCl_3$). As shown in FIG. 3c, these reactant materials build up a core layer 43 of increased index.

Since the usual vapor-phase glass precursor compounds are not oxidic, oxygen or a suitable oxygen bearing compound is generally included in the mixture to form the ultimate oxidic glass. A satisfactory procedure, followed in an actual experiment, takes the form of an oxygen stream which is bubbled through reservoirs of liquid-phase, glass-forming compounds. In one procedure, for example, oxygen streams were bubbled through silicon tetrachloride and through germanium tetrachloride. These streams were then combined with vapor-phase boron trichloride and additional oxygen, the resultant mixture being introduced into the reaction chamber.

The relative amounts of glass-forming ingredients are dependent upon a variety of factors, such as vapor pressure, temperature, flow rate, desired index, etc. A variety of diluent materials may be utilized for any of the previously discussed reasons, so, for example, argon, nitrogen, helium, etc., may be used to maintain desired flow rates to prevent precombustion, etc. Oxygen bearing compounds which may replace oxygen in whole, or in part, include $N_2O$, $NO$, and $CO_2$.

In general, concentration of 3d-transition metal impurities in the gas stream is kept below $10^{-2}$ percent, although further reduction in loss accompanies reduction of those impurities down to the part per billion range. Such levels are readily available from commercial sources or by purification by means similar to those taught by H. C. Theuerer in U.S. Pat. No. 3,071,444. As compared with the usual soot process, the procedure described in the copending MacChesney-O'Connor application is carried out in a controlled environment without direct exposure to combustion products. This inherently results in avoidance of the inclusion of particulate combustion products. Where desired, hydration resulting from combustion in the soot process may be minimized. This is a particularly significant advantage for operation in several portions of the infrared spectrum which suffers from sub-harmonics of the fundamental $H_2O$ absorption. Water vapor may, therefore, be a particularly significant impurity and is kept to a level below a few ppm by volume.

As shown in FIG. 3c, the formation of core layer 43 is halted before the layer has reached the desired thickness. Next, a rod 44 of pure $SiO_2$, or other low-loss material having a different refractive index than core layer 43, is inserted into the preform. Of course, rod 44 must be at least as long as the preform and although shown in FIG. 3c as having a generally triangular cross-section, one skilled in the art will appreciate that other configurations are possible, for example, circular, square, etc.

Figure 3D:
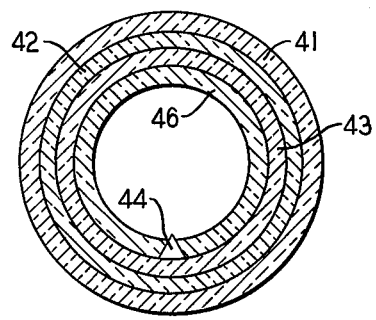

After rod 44 has been inserted into the preform, deposition of the cladding layer is resumed and, as shown in FIG. 3d, the continuation of the deposition process produces a doped layer 46 around and above rod 44, which layer is continuous with layer 43. Thus, when the preform is collapsed and a fiber drawn therefrom, the fiber will have the desired eccentric, longitudinal index inhomogeneity.

Figure 4:
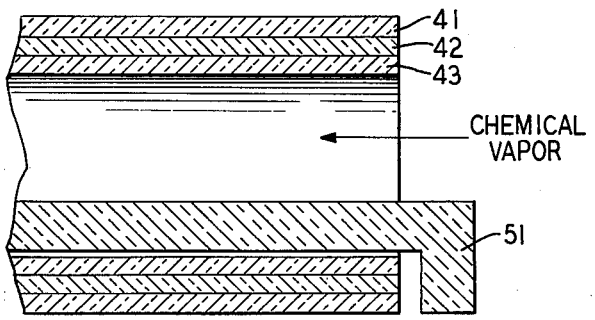
FIG. 4 is a partial, cross-sectional view of an alternative embodiment of the apparatus shown in FIG. 1.

FIG. 4 depicts an alternate embodiment of the invention wherein a silica baffle 51 is employed to shield the preform during the chemical vapor deposition process.

Figure 5A:
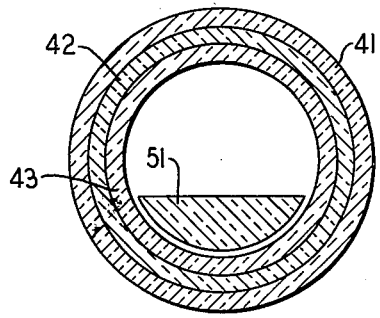
FIGS. 5a and 5b are cross-sectional views of the preform shown in FIG. 4.
Figure 5B:
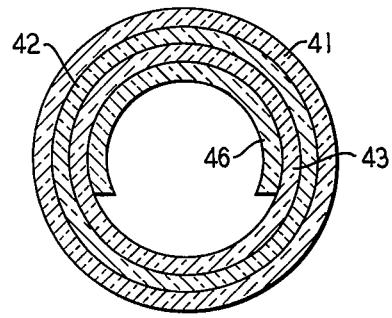

As seen more clearly in FIGS. 5a and 5b, the baffle is inserted into preform 41 after the first core layer 43 has been built up. When the deposition process is resumed, baffle 51 prevents the build-up of the second core layer 46 on the underlying region of the preform. It will be appreciated that baffle 51 can be selectively rotated during the deposition process to alter the thickness of the second core layer in various regions of the preform. Again, when the preform shown in FIG. 5b is collapsed and a fiber is drawn therefrom, the fiber will exhibit the desired eccentric, longitudinal index inhomogeneity.

In the event that preform 41 is rotated during the deposition process, rod 44 in FIG. 3 and baffle 51 in FIGS. 4 and 5 must be rotated along with the preform. This is most easily accomplished by mechanically clamping the ends of the rod or baffle to the preform. Of course, one skilled in the art will appreciate that it is not sufficient to merely induce an eccentric, azimuthal index inhomogeneity. It is also necessary to simultaneously or subsequently induce longitudinal inhomogeneities, for example, by programming the flow of dopants through the preform or by mechanical deformations of the preform, as longitudinal irregularities must be present to couple modes, whether radial or azimuthal.

One skilled in the art may make various changes and substitutions to the layout of parts shown without departing from the spirit and scope of the invention.

What I claim is:

1. In a method of manufacturing a preform which is intended to be subsequently drawn into an optical fiber, said method being of the type that includes the steps of:

flowing a vapor mixture including at least one compound, glass-forming, precursor together with an oxidizing medium through a hollow, cylindrical substrate; and heating said substrate and contained vapor mixture with a moving heat source, external to the substrate, such that a suspension of particulate, oxidic reaction product material is produced within the substrate, said particulate material traveling downstream and coming to rest on the inner surface of said substrate and thereat being fused to form a continuous glassy deposit on said inner surface, the improvement which comprises:

terminating the vapor-flowing and substrate-heating steps recited above before said continuous glassy deposit has attained the desired thickness;

inserting at least one longitudinally extending rod into said substrate, said rod having a refractive index differing from the refractive index of said glassy deposit and being eccentrically positioned within said substrate;

restarting said vapor-flowing and substrate-heating steps to resume the production of said glassy deposit, said deposit forming on the glassy deposit layer previously formed and on said rod; and then terminating said vapor-flowing and substrate-heating steps when said glassy deposit has attained the desired thickness whereby a preform is obtained which, when subsequently collapsed and pulled, yields an optical fiber having an eccentric, longitudinal index inhomogeneity close to the axis of the fiber.

2. The method according to claim 1 including the further step of:

rotating said substrate and said at least one rod during processing.

3. The method according to claim 1 including the further step of:

varying the composition of said glass-forming precursor at least once during processing.

4. The method according to claim 3 wherein said composition-varying step at least occurs subsequent to said rod-inserting step.

5. The method according to claim 3 wherein said composition-varying step at least occurs prior to said rod-inserting step.

6. The method according to claim 1 wherein said rod has an index of refraction which is greater than the average index of said glassy deposit.

7. The method according to claim 1 wherein said rod has an index of refraction which is less than the average index of said glassy deposit.

8. In a method of manufacturing a preform which is intended to be subsequently drawn into an optical fiber, said method being of the type that includes the steps of:

flowing a vapor mixture including at least one compound, glass-forming, precursor together with an oxidizing medium through a hollow, cylindrical substrate; and heating said substrate and contained vapor mixture with a moving heat source, external to the substrate, such that a suspension of particulate, oxidic reaction product material is produced within the substrate, said particulate material traveling downstream and coming to rest on the inner surface of said substrate and thereat being fused to form a continuous glassy deposit on said inner surface, the improvement which comprises:

terminating the vapor-flowing and substrate-heating steps recited above before said continuous glassy deposit has attained the desired thickness;

inserting at least one longitudinally extending baffle into said substrate to shield a portion of said substrate from said particulate material;

restarting said vapor-flowing and substrate-heating steps to resume the production of said glassy deposit, said deposit forming on all portions of the glassy deposit layer previously formed other than those shielded by said at least one baffle; and then terminating the vapor-flowing and substrate-heating steps recited above before said continuous glassy deposit has attained the desired thickness.

9. The method according to claim 8 including the further step of:
rotating said substrate and said at least one baffle during processing.

10. The method according to claim 8 including the further step of:
varying the composition of said glass-forming precursor at least once during processing.

11. The method according to claim 10 wherein said composition-varying step at least occurs subsequent to said baffle-inserting step.

12. The method according to claim 10 wherein said composition-varying step at least occurs prior to said baffle-inserting step.

13. The method according to claim 1 wherein said baffle is comprised of silica.

* * * * *